US012730082B2

(12) United States Patent
Visser et al.

(10) Patent No.: US 12,730,082 B2
(45) Date of Patent: Sep. 8, 2026

(54) MASSIVE DIFFERENTIAL SCANNING CALORIMETRY ANALYSIS METHOD AND APPARATUS

(71) Applicant: VERIDIS TECHNOLOGIES B.V., Eindhoven (NL)

(72) Inventors: Nigel David Jan Visser, Amsterdam (NL); Floris Jelle Anton Gerritsen, Amsterdam (NL); Jeroen Dennis Glansdorp, Hoofddorp (NL)

(73) Assignee: VERIDIS TECHNOLOGIES B.V., Eindhoven (NL)

( * ) Notice: Subject to any disclaimer, the term of this patent is extended or adjusted under 35 U.S.C. 154(b) by 383 days.

(21) Appl. No.: 18/564,060

(22) PCT Filed: May 24, 2022

(86) PCT No.: PCT/NL2022/050282
§ 371 (c)(1),
(2) Date: Nov. 24, 2023

(87) PCT Pub. No.: WO2022/250533
PCT Pub. Date: Dec. 1, 2022

(65) Prior Publication Data
US 2024/0255452 A1 Aug. 1, 2024

(30) Foreign Application Priority Data
May 27, 2021 (NL) ..................................... 2028305

(51) Int. Cl.
*G01N 25/48* (2006.01)

(52) U.S. Cl.
CPC ................................ *G01N 25/4866* (2013.01)

(58) Field of Classification Search
CPC ........................... G01N 25/4866; G01K 17/04
See application file for complete search history.

(56) References Cited

U.S. PATENT DOCUMENTS

| | | | |
|---|---|---|---|
| 6,428,230 | B2 | 8/2002 | Rodgers |
| 6,497,509 | B2 | 12/2002 | Merzliakov et al. |
| 10,481,115 | B2 | 11/2019 | Russell et al. |
| 2005/0190813 | A1 | 9/2005 | Schick |
| 2007/0286769 | A1 | 12/2007 | Massak et al. |

(Continued)

FOREIGN PATENT DOCUMENTS

| | | | |
|---|---|---|---|
| DE | 102015217636 | A1 | 3/2017 |
| GB | 2547113 | A | 8/2017 |

(Continued)

OTHER PUBLICATIONS

Drzezdzon et al. "Characterization of Polymers Based on Differential Scanning Calorimetry Based Techniques", TrAC Trends in Analytical Chemistry, Jan. 2019, pp. 51-56, vol. 110.

(Continued)

*Primary Examiner* — Peter J Macchiarolo
*Assistant Examiner* — Mireille S Sadate-Moualeu
(74) *Attorney, Agent, or Firm* — Steven M. Koehler; Westman, Champlin & Koehler, P.A.

(57) ABSTRACT

A method and apparatus of differential scanning calorimetry comprises: during the heating and/or cooling determining at least one of a temperature and a temperature change of the sample and of the reference; controlling a heating and/or cooling power to the sample and/or the reference on the basis of a difference in the temperature and/or the temperature change relative to a predetermined temperature and/or temperature change and/or on the basis of a difference in the temperature and/or the temperature change between the sample and the reference; determining at least one thermodynamic property of the sample and/or a composition of the sample on the basis of at least one of temperature of the sample, temperature change of the sample and heating and/or cooling power to the sample, relative to at least one of temperature of the reference, temperature change of the reference and heating and/or cooling power to the reference.

20 Claims, 4 Drawing Sheets

(56) References Cited

U.S. PATENT DOCUMENTS

| | | | | |
|---|---|---|---|---|
| 2008/0080586 | A1* | 4/2008 | Huetter | G01N 25/4866 374/E7.004 |
| 2010/0195695 | A1* | 8/2010 | Van De Kerkhof | G01N 25/4833 374/31 |
| 2014/0146847 | A1* | 5/2014 | Van De Kerkhof | G01K 17/00 374/11 |
| 2017/0227480 | A1 | 8/2017 | Russell et al. | |
| 2020/0124548 | A1* | 4/2020 | Russell | G01K 17/00 |

FOREIGN PATENT DOCUMENTS

| | | | | |
|---|---|---|---|---|
| GB | 2547113 B * | 2/2019 | | G01K 17/04 |
| WO | 9533199 A1 | 12/1995 | | |

OTHER PUBLICATIONS

Kodre et al. “Differential Scanning Calorimetry: A Review”, Research and Reviews: Journal of Pharmaceutical Analysis, Jul.-Sep. 2014, pp. 11-22, vol. 3, No. 3.

Watson et al. “A Differential Scanning Calorimeter for Quantitative Differential Thermal Analysis”, Analytical Chemistry, Jun. 1964, pp. 1233-1238, vol. 36, No. 7.

International Search Report and Written Opinion in corresponding International Application No. PCT/NL2022/050282 dated Oct. 19, 2022.

Office Action in corresponding Japanese patent application serial No. 2023-572518 dated Apr. 6, 2026.

* cited by examiner

MASSIVE DIFFERENTIAL SCANNING CALORIMETRY ANALYSIS METHOD AND APPARATUS

CROSS-REFERENCE TO RELATED APPLICATION(S)

This Application is a Section 371 National Stage Application of International Application No. PCT/NL2022/050282, filed May 24, 2022 and published as WO 2022/250533 A1 on Dec. 1, 2022, in English, and further claims priority to Netherlands application Ser. No. 2028305, filed May 27, 2021, the contents of which are hereby incorporated by reference in their entirety.

TECHNICAL FIELD

The present disclosure relates to determination of thermodynamic properties of materials, such as calorimetry, in particular differential scanning calorimetry, more in particular power compensated differential scanning calorimetry. The present disclosure further relates to substance analysis and identification, in particular of polymers.

BACKGROUND

Differential scanning calorimetry ("DSC") is an analytical technique to determine a heat capacity of a material, in particular the specific heat capacity and specific enthalpy of the material, and/or to determine material properties such as glass transition temperature, melting, crystallization, cure process, purity, oxidation behaviour and/or thermal stability. In DSC a heat flow to and from a sample subjected to a temperature change is measured in comparison to a reference.

Generally, the DSC technique may be considered divided into "heat flux DSC" and "power compensation DSC" (sometimes referred to as "power balanced DSC"). Heat flux DSC is related to detection of temperature differences between sample and reference as a function of heating power. Conversely, power compensation DSC is related to detection of differences in thermal effect from a heating power between sample and reference as a function of temperature. In power compensation DSC the sample and the reference are heated in independent sample containers and the heating power to each sample container is controlled and adjusted to minimize temperature differences between the sample and the reference which are due to heat capacity differences. Typically, the sample heats up and/or cools down more slowly than the reference and according adjustment of the heating/cooling power to the sample is required to obtain the desired temperature path of both sample and reference, which adjustment is a measure of the heat capacity difference. The reference may be a material that is substantially inert over the temperature range of interest. Note that in an experiment spanning a large temperature range, plural references may be used for studying different sections of the temperature range.

E.g., various aspects of DSC are discussed in E. S. Watson et al., "A differential scanning calorimeter for quantitative differential thermal analysis", Anal. Chem. 36(7):1233-1238 (1964); K. V. Kodre et al., "Differential scanning calorimetry: a review", Res. and Rev.: J. Pharma. Anal. 3(3):11-22 (2014); and J. Drzezdzon et al., "Characterization of polymers based on differential scanning calorimetry based techniques", Trends Anal. Chem. 110:51-56 (2019). Aspects of (power compensation) DSC and determining heat flow to a sample in DSC are further disclosed in U.S. Pat. Nos. 6,428,230, 6,497,509, US 2007/0286769 A, DE 10 2015 217 636 A1 and US 2020/0124548.

A common concern with the known power compensation DSC methods and apparatus is to keep the sample size as small as possible in order to minimize thermal gradients in the sample and/or for rapid temperature changes.

A continuous desire exists for more accurate determination of the thermodynamical properties of materials such as phase changes and/or more accurate identification of substances based on small differences in the thermodynamic properties. In addition, a desire exists for accurate analysis of large samples compared to the present-day milligram or microgram sizes, possibly even bulk samples.

SUMMARY

In view of the foregoing, herewith are provided a method of differential scanning calorimetry and an apparatus for power compensation differential scanning calorimetry.

The method comprises the steps of:

heating and/or cooling a sample and a reference;

and during the heating and/or cooling

- determining at least one of a temperature and a temperature change of the sample and of the reference;
- controlling a heating power and/or cooling power to the sample and controlling a heating power and/or cooling power to the reference on the basis of a difference in the temperature and/or the temperature change relative to a predetermined temperature and/or temperature change and/or on the basis of a difference in the temperature and/or the temperature change between the sample and the reference;

and the step of

- determining at least one thermodynamic property of the sample and/or a composition of the sample on the basis of at least one of temperature of the sample, temperature change of the sample and heating and/or cooling power to the sample, relative to at least one of temperature of the reference, temperature change of the reference and heating and/or cooling power to the reference.

In the method the sample is heated and/or cooled on a first sample side and the temperature and/or the temperature change of the sample is (are) determined on a second sample side opposite the first sample side, and

- the reference is heated and/or cooled on a first reference side and the temperature and/or the temperature change the reference is (are) determined on a second reference side opposite the first reference side.

Thus, the method comprises

- heating and/or cooling the sample on a first sample side and determining the temperature and/or the temperature change of the sample on a second sample side opposite the first sample side, and
- heating and/or cooling the reference on a first reference side and determining the temperature and/or the temperature change of the reference on a second reference side opposite the first reference side.

The heating and/or cooling of the reference, and associated determination of temperature and/or temperature change, may be done independently or at least partly simultaneous with the heating and/or cooling of the sample, which latter option may be preferred in view of possible small deviations in utilized apparatus.

The method may comprise power compensation DSC, comprising controlling the heating power and/or cooling power to the sample and controlling the heating power and/or cooling power to the reference to minimize a difference in the temperature and/or the temperature change between the sample and the reference. This may in particular be done when both sample and reference are subject to a predetermined temperature change, in particular the same predetermined temperature change, and wherein at least part of the predetermined temperature change may preferably be linear with respect to time. In the method, different from known DSC methods, by determining the temperature and/or temperature change of the sample on an opposite side to the heating and/or cooling thereof, comparably large samples may be studied and resolution of thermal behavior (e.g. detection of enthalpy changes) may be enhanced also of bulk samples.

In the method, a sample heater may be arranged in closer thermal contact or even in direct contact with the sample to heat the sample. This may provide an improvement relative to present-day DSC setups wherein a temperature sensor is arranged between the heater and the sample so that heat from the heater must pass through the sensor to heat the sample, or wherein heating of the sample is indirect as in a Tian-Calvet type setup.

Moreover, a heat flow through the sample, and/or reference, respectively, may be determined which may enable distinct and possibly complementary measurements in parallel.

The method may be generally scale-free and allow determination of the one or more thermodynamic properties of large samples. In the method compensation for a known heating gradient may be achieved.

Also or alternatively, the method allows a new form of differential scanning calorimetry: heat flow DSC. In such heat flow DSC, different to regular power compensation DSC, the heating power and/or cooling power to the sample (and/or to reference, respectively) is controlled not as a function of an absolute temperature difference and/or as a function of a difference of the temperature change (or rate of temperature change) but as a function of the heat flux through the sample (and/or through the reference, respectively).

Since thermodynamic properties, in particular (specific) heat capacity, tend to be material specific, comparison of the determined thermodynamic property with reference values may allow identification of sample material and/or composition of the sample material. E.g., a difference between (properties of) polyethylene and polypropylene and/or other polymers may be readily detectable.

The method may comprise determining at least one of a temperature and a temperature change of the sample on the first sample side and/or determining at least one of a temperature and a temperature change of the reference on the first reference side.

This may improve determination of the temperature and/or temperature change of the sample, since it allows averaging of the detected temperature and/or temperature change over the sample. This applies likewise for the reference. Such improved determination for both sample and reference provides an additional benefit for the method as a whole.

Moreover this improves accuracy of a determination of a heat flow through the sample by a comparison of the temperature and/or the temperature change on the first sample side and on the second sample side. This applies likewise for the reference. Such improved accuracy for both sample and reference provides an additional benefit for the method, and in particular for heat flow DSC.

Although, as noted above, in some cases it may be preferred to omit a temperature sensor on the first sample side, this is considered outweighed by an increase of accuracy and/or flexibility of the method when temperature and/or temperature change is determined on both sides of the sample. This applies likewise for the reference.

Further, possibly in combination with any method disclosed herein, a method of differential scanning calorimetry is provided comprising the steps of:

heating and/or cooling a sample and a reference; and during the heating and/or cooling determining at least one of a temperature and a temperature change of the sample and of the reference;

controlling a heating power and/or cooling power to the sample and controlling a heating power and/or cooling power to the reference on the basis of a difference in the temperature and/or the temperature change relative to a predetermined temperature and/or temperature change and/or on the basis of a difference in the temperature and/or the temperature change between the sample and the reference;

and the step of determining at least one thermodynamic property of the sample and/or a composition of the sample on the basis of at least one of temperature of the sample, temperature change of the sample and heating and/or cooling power to the sample relative to at least one of temperature of the reference, temperature change of the reference and heating and/or cooling power to the reference;

wherein the sample is heated and/or cooled on a first sample side, and the reference is heated and/or cooled on a first reference side.

This method may comprise determining at least one of a temperature and a temperature change of the sample in plural positions on the first sample side and/or of the reference in plural positions on the first reference side. Also or alternatively, the method may comprise determining at least one of a temperature and a temperature change of the sample and/or of the reference in plural positions on the respective second side (i.e. second sample side and/or, respectively, second reference side).

E.g., the sample temperature and/or reference temperature may be determined using a temperature detector comprising a sensor configured for determining a temperature and/or a temperature difference as a function of position and/or a plurality of sensors which may be arranged in a regular or irregular array; this may allow simultaneous detection in the plural positions preventing temporal differences. Also or alternatively, a thermal camera may be employed as a sensor for determining a temperature and/or a temperature change as a function of position in plural positions in parallel. A suitable thermal camera may be infrared-sensitive and possibly also sensitive for visible and/or ultraviolet wavelengths.

This facilitates averaging of the temperature and/or temperature change over at least part of the sample and/or reference. This may increase accuracy by preventing local variations to affect the measurement. E.g., it may simplify allowing for uneven occurrences of one or more of radiation, convection or conduction of heat.

However, also or alternatively, this facilitates one or more position-specific determinations. Such spatially resolved determinations may provide information on one or more of differences and/or changes in the apparatus with which the method is performed, e.g. in case of differences in thermal connection with a heater. Also or alternatively, such spatially resolved determinations may provide information on local differences in sample properties and/or behavior, e.g. local heat flow differences. Such differences may indicate differences in sample composition and/or homogeneity, which may be a signal of impurities and/or density variations in the sample.

In any method herein, the sample may have a size in a first dimension being at least one order of magnitude less, preferably plural orders of magnitude less, than in a second dimension and possibly also at least one order of magnitude less, preferably plural orders of magnitude less, than in a third dimension.

The first and second sides of the sample then may be opposite each other in the first dimension. The same may apply for the reference. Preferably the sample and reference have the same shape and/or the same size in at least the first dimension, preferably also in one or both of the second dimension and third dimension.

Thus, the sample may be elongated and/or, preferably, plate-like. By providing the sample in such shape and providing the determination in the first dimension, provision of at least part of the analysis may be generally scale-free in the second and third dimensions; in particular if thermal gradients in the second and/or third dimension are absent or are at least significantly smaller than in the first dimension.

The size in at least the first dimension may be determined as a function of one or more of thermal material properties, heating rate and required sensitivity of the sample to be studied.

In at least the first dimension the size and/or shape of the sample may be constant and/or the first and second sides may be parallel to each other. A constant size and/or shape in one or more dimensions may prevent effects and/or artefacts of a size change. E.g. This may facilitate comparison of detections in plural positions in a spatially resolved measurement.

Note that, for different samples, in particular samples of different materials and/or different composition, a sample container may be exchanged. Also or alternatively, different references may be used as well, the selection of which may depend on one or more (expected) sample properties.

In any method herein, at least part of the sample may be placed in an upright sample container wherein the first and second sample sides are defined by horizontally opposite sides of the sample container. Also or alternatively, at least part of the sample may also be received in a sample container that is liquid tight for holding a liquid sample portion. Likewise, at least part of the reference may be placed in an upright reference container, which may be liquid tight for holding a liquid reference portion, wherein the first and second reference sides may be defined by horizontally opposite sides of the reference container.

At least part of the sample may be provided as one or more objects, e.g. in a form of one or more chunks, chips, flakes, etc., and/or in a granular form, which may include fine-grain powder.

Any method herein may comprise melting at least part of the sample and determining a heat flow through the sample in a horizontal direction and/or in a direction parallel to a liquid level of the molten sample material, e.g. in a direction parallel to an average position of a liquid meniscus.

In such ways the heat flow through the sample and sample container may be determined without interruption of a sample surface and gas barrier. The sample may adopt the shape of the sample container, in particular if the sample is one or more of granular, at least partly liquid and/or has been liquified.

In particular in case of a sample provided as one or more objects, e.g. as flakes and/or in a granular form, the method may comprise flowing a gas, in particular an inert gas over and/or through at least part of the sample, possibly at least in part during heating and/or cooling of the sample.

This allows removal of substances that may become dissociated and/or be evaporated from the sample material. Also or alternatively, by appropriate selection of and/or control over a composition of the gas, a chemical reaction of the sample material such as oxidation may be induced or rather be prevented.

Any method herein may comprise controlling the heating and/or cooling power to provide a predetermined heating and/or cooling rate of the sample and/or of the reference.

Any method herein may comprise providing a modulation to the heating power and/or cooling power to the sample and/or to the heating power and/or cooling power to the reference to provide a predetermined heating rate modulation to the sample and/or to the reference which may result in a temperature modulation and/or temperature change modulation (varying rate of temperature change). The modulation, e.g. a heating rate modulation, may be periodic, e.g., the heating rate modulation taking the form of $$q = q_0 + \delta q \cdot \cos(\omega t)$$

The method may comprise detecting one or more of hysteresis in at least one thermodynamic property of the sample, a phase change in the sample, a chemical reaction in the sample and an irreversible change in the sample. Such detection may be based on a difference between one or more reversible signal components and one or more irreversible signal components in at least one of the sample temperature, sample temperature change and heat flow through the sample. The detection may comprise lock-in detection of the heating rate modulation and temperature detection (of one or more temperature sensors) and/or it may comprise performing a Fourier transform on at least one of the heating rate modulation, the heating power and/or cooling power to the sample and/or of the reference, the sample temperature, sample temperature change and heat flow through the sample, the reference temperature, reference temperature change and heat flow through the reference.

Associated with any embodiment of the method, an apparatus for power compensation differential scanning calorimetry is herewith provided.

In particular, the apparatus comprises

- a sample container for holding a sample;
- a reference and/or a reference container for holding a reference;
- a sample heater and a reference heater;
- a sample temperature detector for determining a temperature and/or a temperature change of the sample;
- a reference temperature detector for determining a temperature and/or a temperature change of the reference;
- a controller being configured for controlling a heating power and/or cooling power to the sample and controlling a heating power and/or cooling power to the reference on the basis of a difference in the temperature and/or the temperature change relative to a predetermined temperature and/or temperature change and/or on the basis of a difference in the temperature and/or the temperature change between the sample and the reference.

In the apparatus, the sample heater is arranged for heating and/or cooling the sample on a first sample side and the sample temperature detector is arranged for determining the temperature and/or a temperature change of the sample on a second sample side opposite the first sample side, and the reference heater is arranged for heating and/or cooling the reference on a first reference side and the reference temperature detector is arranged for determining the temperature and/or a temperature change of the reference on a second reference side opposite the first reference side.

E.g., the sample heater is arranged on a first sample side and the sample temperature detector is arranged on a second sample side opposite the first sample side, and the reference heater is arranged on a first reference side and the reference temperature detector is arranged on a second reference side opposite the first reference side,

- for heating and/or cooling the sample on the first sample side and the reference on the first reference side, and
- for determining the temperature and/or the temperature change of the sample on the second sample side and determining the temperature and/or the temperature change of the reference on the second reference side.

Such apparatus facilitates performing the method described herein and it may provide power compensation DSC with improved accuracy.

The heater controller may be connected with the sample heater and/or the reference heater, or with a sample heater controller and/or a reference heater controller. Also or alternatively, the heater controller may be connected with the sample temperature detector and/or the reference temperature detector. Thus, direct interaction of the controller with operation of the apparatus may be facilitated.

The sample container may comprise on the first and/or second side a wall of relatively high thermal conductivity, e.g. a metal wall. On one or more other sides, the sample container may comprise one or more thermally insulating walls, e.g. of a polymeric material such as a material having a heat conductivity of less than k=0.2, preferably less than 0.1 more preferably less than 0.05, and/or having a thermal conductivity of less than 50% of the expected heat conductivity of the sample material, preferably less than 30%, more preferably less than 20% such as less than 10% or even less than 5% of the expected heat conductivity of the sample material. The lower the heat conductivity is, the better the thermal insulation of the sample material is from a space surrounding the sample container and therefore the more accurate the measurement may be since heat from the heater into the sample cannot flow out of the sample at such sides and the heat flow is therefore better directed from the first side to the second side.

The apparatus may be configured for contact heating the sample container by the heater. E.g. the heater being in contact with the sample container without a gaseous layer in between the heater and the sample container. The same may apply for (contact) heating the reference.

The sample heater and/or the sample temperature detector may be connected with, or be part of, the sample container. E.g., the sample heater may define and/or provide a side wall of the sample container. Likewise, the reference heater and/or the reference temperature detector may be connected with, or be part of, the reference container.

The apparatus may comprise a further sample temperature detector for determining a temperature and/or a temperature change of the sample arranged on the first sample side; and/or a further reference temperature detector for determining at least one of a temperature and a temperature change of the reference arranged on the first reference side. Such apparatus allows determination of a heat gradient across the sample and/or the reference. This facilitates determination of a heat flow through the sample and/or reference.

Further, herein is provided an apparatus for power compensation differential scanning calorimetry, which may be

- a sample container for holding a sample;
- a reference and/or a reference container for holding a reference;
- a sample heater and a reference heater;
- a sample temperature detector for determining a temperature and/or a temperature change of the sample;
- a reference temperature detector for determining a temperature and/or a temperature change of the reference;
- a controller being configured for controlling a heating power and/or cooling power to the sample and controlling a heating power and/or cooling power to the reference on the basis of a difference in the temperature and/or the temperature change relative to a predetermined temperature and/or temperature change and/or on the basis of a difference in the temperature and/or the temperature change between the sample and the reference,
- wherein at least one of the sample temperature detector, further sample temperature detector, reference temperature detector and further reference temperature detector may comprise a sensor configured for determining a temperature and/or a temperature difference as a function of position and/or a plurality of temperature sensors in plural positions on the respective one(s) of the first sample side, second sample side, first reference side and second reference side. One or more of the plurality of temperature sensors may be or comprise a sensor configured for determining a temperature and/or a temperature difference as a function of position.

The detector may comprise an optical detector such as a thermal camera with which at least part of the sample container and/or a reference may be imaged. A fiber optical detector, e.g. comprising a distributed Bragg reflector, may also allow position sensitive detection.

An apparatus comprising such detector comprising a plurality of sensors may be arranged such that one or more signals of at least some of the plurality of sensors are detectable together, e.g. for purposes of signal enhancement and/or averaging. Also or alternatively, such apparatus may be arranged such that one or more signals of at least some of the plurality of sensors are detectable individually and/or as a subgroup of the respective plurality of temperature sensors, e.g. for position-specific and/or spatially resolved determinations.

At least one of the detectors and/or the controller may allow selecting between collective, individual and/or subgroup-based detection of the respective sensors.

Thermocouples, thermistors, thermopiles, bolometers, fiber optical detectors, may form suitable sensors, either alone or in any suitable combination.

In the apparatus, the first and second sides of the sample container may be opposite each other in a first dimension and the sample container may have a size in a first dimension being at least one order of magnitude less, preferably plural orders of magnitude less, than in a second dimension and possibly also at least one order of magnitude less, preferably plural orders of magnitude less, than in a third dimension.

The same may apply to the reference and/or the reference container, mutatis mutandis.

The sample container and/or the reference container may comprise an upright sample container defining the first and second sides as upright sides on generally horizontally opposite sides of the sample container. Also or alternatively, the sample container may be liquid tight for holding a liquid sample portion, e.g. a liquefiable fraction of the sample.

At least part of the sample may be provided as one or more objects, e.g. in a granular form, including a fine-grain powder form. Then, a determination, e.g. a heat flow determination, may be performed in a horizontal direction and/or in a direction parallel to a filling level of the granular sample material.

The apparatus may comprise a sample oven and a reference oven, wherein the sample oven comprises the sample container, the sample heater and the sample temperature detector(s) and the reference oven comprises the reference and/or the reference container, the reference heater and the reference temperature detector(s).

The sample oven and reference oven should preferably be thermally insulated from each other, more preferably being substantially thermally separate from each other, so that heating and/or cooling of one of the sample and the reference does not affect, or at least not substantially affect, heating and/or cooling of the other one of the sample and the reference (i.e. other than (an effect of) the controlled heating and/or cooling of the one on the basis of the temperature and/or temperature change of the other as foreseen in the method discussed herein). Thermal interaction between the ovens, other than via the controlled heating and/or cooling for the DSC, may degrade accuracy of the detection and should therefore be reduced or prevented. In some cases, it may be preferred to physically separate the ovens although it may be practical to combine both ovens as separate sections in a single housing.

The apparatus may comprise a sample chamber accommodating the sample container and a gas system and/or a vacuum system connected to the chamber for controlling at least one gas property such as a gas pressure, a gas composition and/or gas humidity, a gas temperature and a gas flow around and/or through at least part of the sample container. The sample chamber may be the sample oven.

Likewise, the apparatus may comprise a reference chamber accommodating the reference container and a gas system and/or a vacuum system connected to the chamber for controlling at least one of a gas composition and/or gas humidity, a gas temperature, a gas flow around and/or through at least part of the reference container. The reference chamber may be the reference oven.

In the sample chamber and/or, respectively the reference chamber, the gas system may be configured to control a gas in one or both the respective chambers with respect to, e.g. a gas flow rate and/or a rate of change of one gas property to another gas property (e.g. changing a gas composition and/or gas humidity and/or gas temperature).

BRIEF DESCRIPTION OF THE DRAWINGS

The above-described aspects will hereafter be more explained with further details and benefits with reference to the drawings showing a number of embodiments by way of example.

DETAILED DESCRIPTION OF EMBODIMENTS

Figure 1:
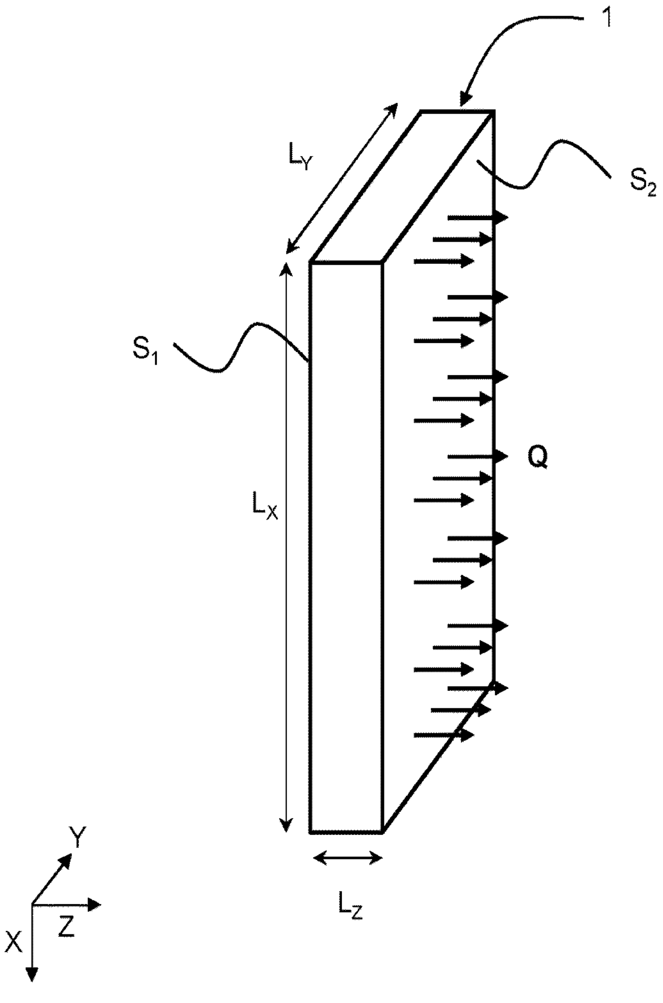
FIG. 1 indicates a plate-like sample.

It is noted that the drawings are schematic, not necessarily to scale and that details that are not required for understanding the present invention may have been omitted. The terms "upward", "downward", "below", "above", and the like relate to the embodiments as oriented in the drawings, unless otherwise specified. Further, elements that are at least substantially identical or that perform an at least substantially identical function are denoted by the same numeral, where helpful individualized with alphabetic suffixes.

Further, unless otherwise specified, terms like "detachable" and "removably connected" are intended to mean that respective parts may be disconnected essentially without damage or destruction of either part, e.g. excluding structures in which the parts are integral (e.g. welded or molded as one piece), but including structures in which parts are attached by or as mated connectors, fasteners, releasable self-fastening features, etc.

FIG. 1 indicates a plate-like sample 1 having a thickness of size $L_Z$ in a first dimension Z, and having a length and a width of sizes $L_X$ and $L_Y$ in a second and third dimension X, Y, respectively (see also the reference coordinate systems in the Figs.). The thickness of the sample 1 is several orders of magnitude less than the width and height, respectively. A suitable sample thickness $L_Z$ may be in a range from 1 to 25 mm, in particular in a range 2-20 mm, more in particular in a range 3-15 mm, preferably 4-10 mm such as in a range 5-7 mm. A thinner sample e.g. having a thickness in a range 2-5 mm may increase local accuracy but at a cost of averaging and of sample size. Also inclusions, density variations and/or impurities may be best detectable in samples having a thickness of about 4-6 mm whereas thicker samples may allow for bulk analysis. Lateral sizes (X, Y dimensions) may be selected at will preferably as long as these are sufficiently larger than the direction of heat flow so that (undesired) uneven heating and/or any edge effects can be disregarded and/or heat flow is at least predominantly in the first dimension.

In use, the sample 1 is heated and/or cooled on a first sample side $S_1$. A temperature $T_1$ and a temperature $T_2$ of the sample 1 may be determined on the first sample side $S_1$ and a second sample side $S_2$ opposite the first sample side $S_1$, respectively.

For a DSC measurement of a finite duration on a sample, it is desired to minimize heat gradients in the sample (or rather: sample and sample container holding the sample). Consider volume incompressibility given by $$L_1 L_2 L_3 = V_0 \rightarrow \lambda_1 \lambda_2 \lambda_3 = 1 \tag{1}$$

where $L_i$ is the length in a particular direction (i=1, 2, 3 which in the Figs. may correspond to Z, X and Y, respectively), $V_0$ is the constant volume and $\lambda_i$ is the stretch ratio in the respective direction, and approximate the diffusion equation by $$\tau = \frac{L^2}{D}, \tag{2}$$

where τ is the diffusion time scale, L is the length in the direction under consideration and D the diffusion coefficient, which is generally dependent on the sample material properties. Then, the presently provided concepts allow or for reduction of rand/or for increasing a size of the sample without sacrificing detection sensitivity compared to commonly known methods and apparatus relying on a cylindrical design for the sample and sample container, e.g. a Tian-Calvet differential scanning calorimeter.

Without wishing to be bound to any particular theory, is it is believed that in a simplified form, in the presently presented concept, assuming even heating of the sample 1 on the first side $S_1$ and ignoring non-equilibrium effects, the governing equations are:

$$\dot{Q} = kA(T_2 - T_1)L^{-1} = kA\Delta TL^{-1}, \tag{3}$$

$$Q = mc_p\Delta T$$

and $$\partial_t H = C_P\partial_t T + f(T, t) \tag{4}$$

where Q is heat, $\dot{Q}$ is the time derivative of heat, k is the thermal conductivity of the sample material, A is the surface area of the first side $S_1$, ΔT is temperature difference, m is mass of the sample, $c_p$ is the specific heat capacity of the sample at constant pressure, H is enthalpy of the sample, $C_P$ is the heat capacity of the sample at constant pressure, $\partial_t$ denotes partial derivative to time and f(t) represents a phase change in the sample material.

By inducing a known and constant heat flow through the sample the influence of the material heat capacity $c_p$ and the material phase changes f(T, t) be determined. Thus, from Eqs. 3 can be derived that:

$$Q_1 = Q_2$$

$$mc_p\Delta T = kAL^{-1}\Delta T\Delta t$$

$$\rho ALc_p = kAL^{-1}\Delta t$$

Resulting in:

$$c_p = \frac{k\Delta t}{\rho L^2} \tag{5}$$

where Δt is time difference and ρ is density.

Expanding the above to time dependent behavior yields $$\dot{Q}_1 = kA\Delta TL^{-1}, \quad \dot{Q}_2 = \partial_t(mc_p\Delta T)$$

$$\dot{Q}_2 = mc_p\partial_t T$$

$$\dot{Q}_2 = \rho ALc_p\partial_t T.$$

And since the heat flowing in is absorbed by the sample mass it follows that $$\dot{Q}_1 = \dot{Q}_2 \tag{6}$$

-continued $$kA\Delta TL^{-1} = \rho ALc_p\partial_t T$$

$$\partial_t T = \frac{k}{\rho c_p L^2}\Delta T$$

which gives heating rate ($\partial_t$T), sensitivity (ΔT) and sample chamber thickness (L; in FIG. 1 being $L_Z$) constraints, as dependencies of each other and the relevant thermodynamic material properties. Now, using this and Eq. 4 above we obtain $$\partial_T H = C_P + \frac{c_p\rho L^2}{k\Delta T}f(T, t) \tag{7}$$

This gives the enthalpy per temperature step $\partial_T$H as function of the heat capacity $c_p$, phase transition response f(T, t) and previously given parameters.

Note that the present concepts are inherently scale-free dependent on the specified volume $V_0$. Thus, a high-volume DSC or a very sensitive nano-DSC can both be realized within the present concepts. Further, the better ΔT, ρ, k and L of a sample are known, the better a phase change response f(T, t) may be determined.

The preceding discussion relating to the sample also equally applies to a reference according to FIG. 1.

Figure 2:
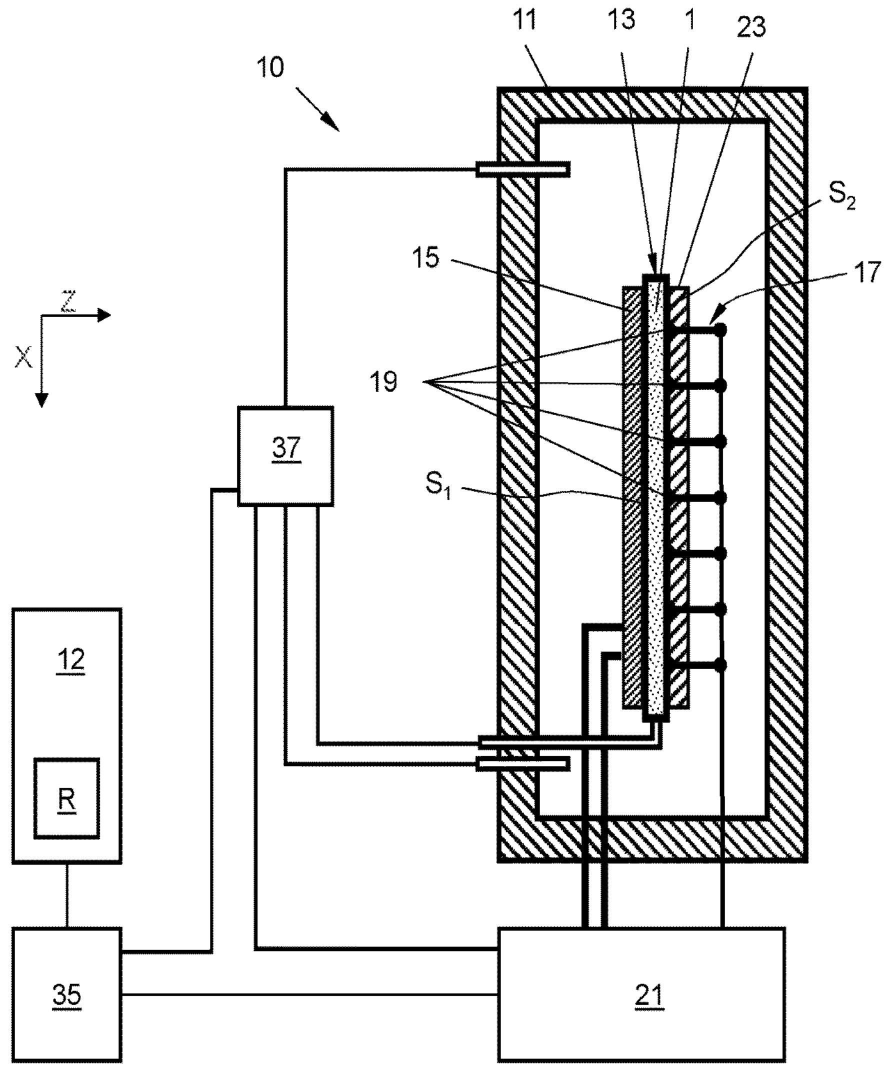
FIG. 2 shows part of an apparatus for power compensation differential scanning calorimetry according to the present principles.

FIG. 2 shows part of an apparatus 10 for power compensation differential scanning calorimetry. The apparatus comprises a sample chamber 11 in the form of a thermally isolated oven. The apparatus 10 may comprise a reference chamber 12 containing a reference R (only indicated in general), which may be substantially identical to the sample chamber 11; in such case, the word "sample" below may be understood as replaced or replaceable by "reference". Note that also or alternatively one or more further sample chambers and/or reference chambers may be comprised in the apparatus 10 which may be substantially identical to the sample chamber 11. The more similar the chambers may be, the easier and/or the better measurements on such chambers may be comparable and the more accurate any results may be.

The shown sample chamber 11 comprises a sample container 13 for holding a sample 1, a sample heater 15, and a sample temperature detector 17 for determining a temperature and/or a temperature change of the sample 1. The sample temperature detector 17 comprises a plurality of temperature sensors 19 each connected with a heater controller 21.

The temperature sensors 19 may e.g. comprise one or more of thermocouples, temperature-dependent resistors and infrared cameras. For some measurements determination of a specific temperature may be required or desired, for other measurements determination of temperature change may suffice.

Spaces between adjacent sensors 19 may be left open or, as shown, provided with a mounting frame 23 which may comprise an insulator of thermal insulation material. The mounting frame 23 may support the sensors 19 and/or define their positions. Also or alternatively, (the insulator of) the mounting frame 23 may also reduce or prevent thermal differences due to gas turbulence and/or gas flow along at least part of the sample chamber 11 and/or radiation loss from the sample chamber 11.

Figure 3:
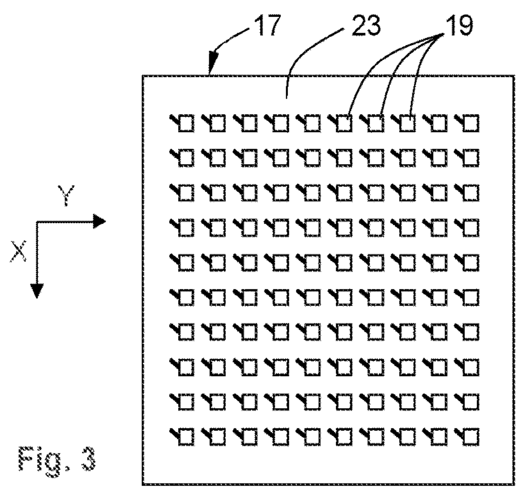
FIG. 3 shows part of a detector comprising plural sensors.

FIG. 3 shows that in the detector 17, the sensors 19 are preferably arranged in a regular array in the frame 23.

The sample container 13 may be, as shown, arranged upright and define the first and second sides $S_1$, $S_2$ as upright sides on generally horizontally opposite sides of the sample container 13. The sample container 13 preferably is liquid tight for holding a liquid sample portion, e.g. a liquefiable fraction of the sample.

The sample heater 15 is arranged for heating and/or cooling the sample 1 on the first sample side $S_1$ and the sample temperature detector 17 is arranged for determining the temperature and/or a temperature change of the sample 1 on the second sample side $S_2$ opposite the first sample side $S_1$.

The sample heater 15 may comprise a heating element, a cooling element, or both heating and cooling elements, which may be integrated, any of which may comprise electrical heaters like current loops, induction heaters, etc., conduits for flowing hot and/or cold gases and/or liquids, thermoelectric elements like Peltier elements, etc., see also below. One or more radiation heating elements like infrared radiators and/or microwave radiators may be used as well. A combination of heating elements and cooling elements, in particular if on different size scales and/or heating/coaling power scales, may simplify and/or increase control over a temperature established by the heater and/or heat transferred to the sample 1, e.g. to achieve a uniform temperature profile (in X and Y direction in FIGS. 1-2) across a sample surface to be heated.

The apparatus 10 may comprise a weight sensor like scales to determine the weight of the sample. The weight sensor may be included in the sample chamber and/or sample container and/or may be configured for repetitive determination so that a weight change of at least part of the sample and/or the reference may be determined, possibly in relation with a temperature and/or a temperature change of at least part of the sample and/or of the reference. Such apparatus may in particular (also) be used for Thermo-Gravimetric Analysis (TGA).

Figure 4:
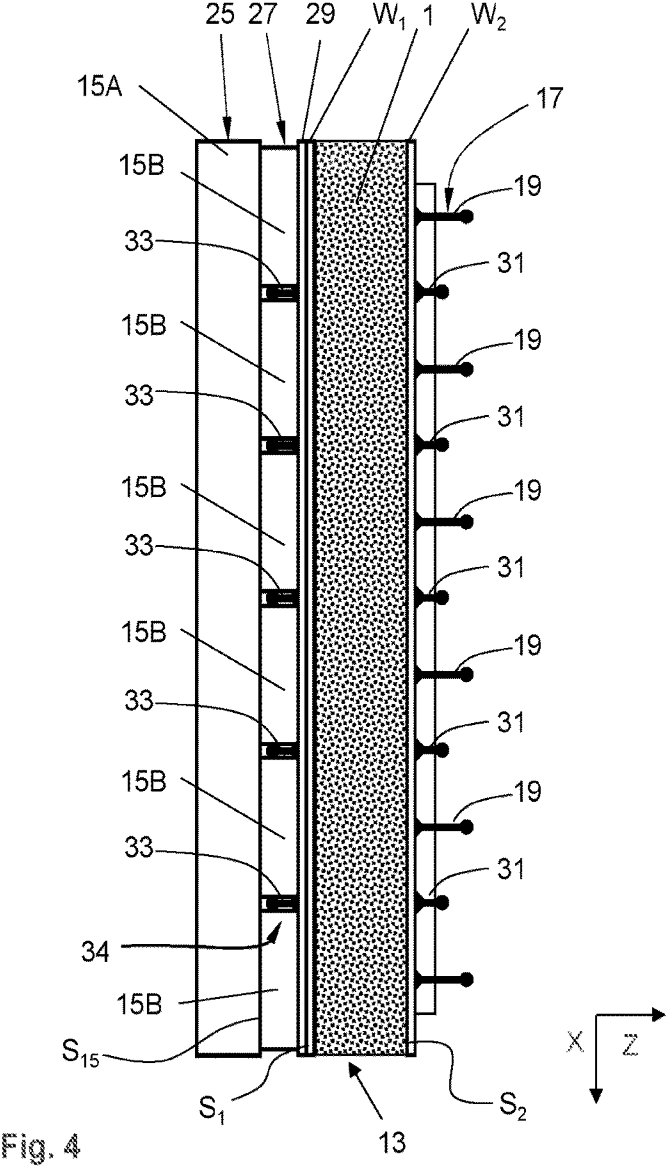
FIG. 4 shows a detail of an embodiment comprising a heater.

FIG. 4 shows a detail of an embodiment comprising a heater 15 which as an option comprises a combination of a first heater 15A for even heating of a heater surface $S_{15}$ and a plurality of second heaters 15B for additional localized heating or cooling of the sample or other object to be heated. E.g., the sample heater 15 may comprise a layered structure having a first layer 25 forming the first heater 15A and a second layer 27 on top of the first layer comprising the second heaters 15B, which layers may or may not have the same size. The first layer 25 may comprise a stack of materials having different thermal conductivities for evening temperature and/or heating across the heating surface (X and Y directions), e.g. a sequence of metallic layers having relatively high thermal conductivity and metallic and/or non-metallic layers having a relatively low thermal conductivity. The second layer 27 may comprise separate heaters 15B, e.g. thermoelectric heaters such as Peltier elements, of which one or more may be controlled individually and/or as a group which may facilitate or simplify providing a controlled heating and/or heating change, which may be associated with a local property of the sample e.g. a local variation in density and/or composition relative to one or more other positions in the sample.

Optionally, any spaces between second heaters 15B may be filled with a material having a relatively high thermal conductivity and/or optionally a further layer 29 having a relatively high thermal conductivity may be provided to prevent potentially sharp temperature gradients between the local heaters 15B. Note that such functionality of a third layer may be provided by part of a wall portion $W_1$, $W_2$, of the sample container 13.

In an apparatus 10 having a heater 15 with locally controllable heating, such as the heater 15 of FIG. 3, an arrangement of at least some of the temperature sensors 19 of a temperature detector 17 may conform to an arrangement of at least some of the locally controllable heating positions, e.g. sensor positions being aligned to the second heaters 15B. Also or alternatively, temperature sensors 31 of the temperature detector 17 may rather be aligned to positions between the second heaters 15B and/or other temperature sensors 33 of an additional temperature detector 34 may be placed directly between the second heaters 15B. Temperature sensors 31, 33 directly opposite each other may increase sensitivity for heat flow; arranging at least some temperature sensors 33 between the second heaters 15B may provide temperature detection on the heater side without requiring heat flow through the sensors 33 from the heater 15 to the sample 1.

Referring to FIG. 2 again, the apparatus 10 comprises a controller 35 connected with the sample heater 15 and the sample temperature detector 17. The controller 35 is also connected to (the heater and temperature detector of) the reference chamber 12. The controller 35 is configured for controlling a heating power and/or cooling power to the sample 1 and controlling a heating power and/or cooling power to the reference R on the basis of a difference in the temperature and/or the temperature change between the sample 1 and the reference R. The controller 35 may be a dedicated device, however, at least part of the controller may be a computer adapted to execute steps of the method disclosed herein and/or perform calculations using any of the equations disclosed herein.

Further, the apparatus 10 comprises an optional gas handling system 37 connected to the chamber for controlling at least one of a gas composition and/or gas humidity, a gas temperature, and a gas flow through the chamber 11 around at least part of the sample container 13, and also or alternatively through the sample container 13 and any sample material therein. Typically, the gas is air or, preferably, nitrogen and/or another inert gas or gas mixture.

The chamber may be evacuated by an optional vacuum system for providing vacuum insulation of the sample container and sample; in FIG. 2, the vacuum system is integrated into the gas handling system 37 as a further option. The gas handling system 37 may comprise one or more gas supplies (e.g. tanks), gas desiccation and/or humidification system, a gas mixing system, pressure regulation, etc. (not shown). The gas handling system may also comprise one or more gas heaters and/or gas coolers which may comprise one or more heat exchangers and/or one or more vortex tubes. As an option, the gas handling system 37 is connected with the controller 35 and/or the controller 21 for controlling gas handling and/or temperature of the gas.

At least part of the gas handling system 37 and the chamber may be closed so that no gas is added to and/or is lost from the apparatus and/or during a measurement, which might otherwise present a change to the system and affect measurement accuracy. Also, some volatile matter from a sample may be noxious to an operator and/or the environment without proper treatment.

Figure 5:
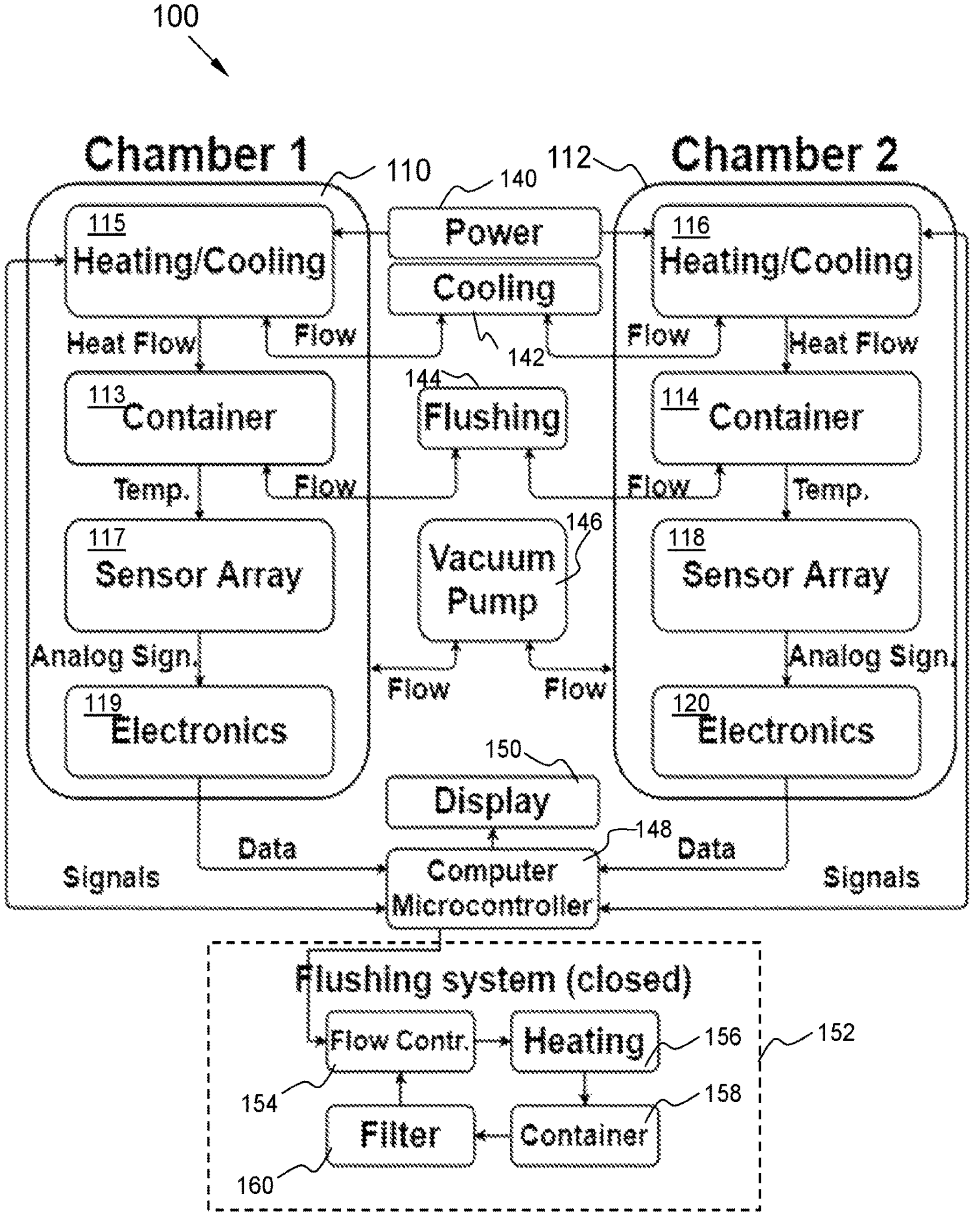
FIG. 5 schematically indicates several elements of an exemplary embodiment of an apparatus and relations between them in some detail.

FIG. 5 schematically indicates several elements of an exemplary embodiment of an apparatus 100 and relations between them in some detail. The apparatus 100 comprises two substantially identical and identically operated chambers 110, 112, one for a test sample and one for a reference sample.

Associated with each chamber 110, 112, the apparatus comprises a heating and cooling system 115, 116 comprising a heater having heating elements and connected with control system electronics in a heater controller. The heater is connected with a power supply 140 for providing heating power. The heating and cooling systems 115 116 are, as an option provided with a common cooling system 142. The cooling system may be or comprise a compressed air cooling system which may provide an air flow to the heater and/or which may comprise vortex cooling. Note that vortex cooling of a gas may also provide a hot gas stream which may be used for heating of at least part of the apparatus.

Associated with each chamber 110, 112, the apparatus comprises a sample container 113, 114 preferably comprising metal plating for the opposite side walls associated with the heater and with a temperature detector, and insulation material for walls defining other sides of the sample container.

An optional gas flushing system 144 (which may as an option be connected and/or integrated with the heating system and/or the cooling system) is provided with which a nitrogen flow through the chamber 110, 112 and/or a sample container 113, 114 and a sample (or reference sample) contained therein may be provided.

An optional vacuum pump system 146 is provided for at least partial evacuation of one or both chambers 110, 112. The vacuum may reach a pressure below 10 kPa preferably below 5 kPa more preferably below 1 kPa or even lower like below 500 Pa or still lower, given time and/or pumping power. The vacuum level may be determined for removal of gases and/or volatile matter, possibly including boiling off of impurities and/or contamination from the sample and/or sample chamber contents, and/or for providing thermal insulation of the sample from surrounding walls and/or other objects.

For temperature detection of the sample and reference, each chamber 110, 112 is provided with a sensor array 117, 118 of a plurality of temperature sensors, mounted in a mounting which may be formed as a frame. The sensors may be configured for data recording and/or wireless transmission of data, and/or they may be connected with one or more signal conductors such as circuit board mounted conductors and/or cables which should be heat-resistant and prevent thermal effects such as outgassing of insulating materials; e.g. electrical insulation may be provided by relatively inert materials such as glass and/or ceramic beads around conductors.

Further, read-out electronics 119, 120 are provided connected with the temperature sensors. The read-out electronics 119, 120 comprise data acquisition ("DAQ") components connected to a printed circuit board ("PCB") possibly supporting other electronic components. One or more sensors of the sensor array 119 may be configured to provide analog signals, such as thermistors and/or thermocouples, which may prevent noise and/or which may obviate energy supplies to the sensors. For data acquisition one or more analog-to-digital converters may be used. Note that also other sensors may be provided such as one or more temperature and/or temperature change sensors arranged in the chamber without direct (thermal and/or physical) contact with the sample holder and/or sample, e.g. (infrared and/or visible radiation) cameras, gas pressure detectors, gas composition detectors.

In operation, heat from the heater flows into the sample chamber and in particular into the sample container and a sample contained therein. Data indicative of the sample temperature is measured using the temperature sensors. The measured data are transmitted as data signals to the read-out electronics which may convert the data to temperature data and which data (converted or not) in turn are transmitted to a computer and/or microcontroller 148 (and/or any other suitable controller) serving as a controller for the apparatus for (further) conversion of and/or calculation with the data and/or for control. The computer and/or microcontroller is also connected with the heater to/from which it transmits and/or receives control data and/or operation data. At least part of the data and/or other data received at and/or transmitted from the computer and/or microcontroller, such as data indicative of operation of the apparatus and/or status of a temperature program may be indicated on an optional display 150.

Likewise, due to the same arrangement and operation, at least some associated of data signals, temperature data, control data and/or operation data from the second chamber are received at and/or transmitted from the computer and/or microcontroller 148 and may be indicated on the optional display 150.

Any controller of an apparatus described herein, in particular the computer and/or microcontroller may comprise a memory for storing and/or retrieving a computer program comprising instructions to cause the apparatus 100 to execute one or more steps of the method.

The computer and/or microcontroller 148 may also be connected with a gas flushing system 152 that may be closed and/or be part of a gas handling system also comprising the vacuum system 146 and/or the compressed air cooling system 144 and/or a further sample container gas system.

Such gas flushing system 152 may comprise one or more of, and possibly arranged in a loop as indicated, a mass flow controller 154 for assessing at least part of a gas flow from and/or to the chamber; a heating and/or cooling element for heating and/or cooling at least part of the gas 156—however, the gas flow may also or alternatively pass through the heating/cooling system 115; (connections to) the a sample chamber 158 and/or a sample container; and a gas cleaning system such as a physical and/or chemical filter which may comprise an active carbon filter 160 for cleaning (filtering) at least part of the gas.

Generally, a DSC measurement may comprise providing the sample to be tested as particulate matter, e.g. a powder, into the sample container and placing the sample container into the sample chamber. A reference of suitable construction is placed into the reference chamber. The reference may be a particular object and/or a particular filling of a reference container. The sample chamber and reference chamber and the sample container and reference container may be mutually identical and obtain their identification as "sample chamber"/"reference chamber" and "sample container"/"reference container" solely as temporary indications from the nature of the contents of the respective container.

Next, the sample chamber and reference chamber are gas flushed and evacuated one or more times, including a gas flush through (the sample in) the sample container, e.g. for removing (water) vapor and/or other volatile substances. Gas having passed through the chamber and/or sample may be subjected to treatment and/or study to determine any chemical composition and/or chemical reaction and/or mass loss of the sample. Also or alternatively, the mass of the sample may be determined with scales.

Next, the sample and reference are subjected to a temperature program comprising controlled heating over a temperature range, which range may span several hundreds of Kelvins, and cooling down which may also be controlled. During the temperature program the heating and/or the heating rate, and the temperature and/or the temperature change of the sample and the reference may be determined and the heating and/or the heating rate of the sample may be controlled relative to that (those) of the reference by controlling the heating power and/or cooling power to the sample heater; a relatively higher or lower power required to change the sample temperature by a particular amount compared to the same temperature change of the reference may indicate a change in the specific heat capacity $c_p$ and/or a phase change(s) f(T, t) of the sample. During such temperature program gas flushing, preferably including treatment and/or study, such as described above, may be used as well.

One or more such "runs" (executing such temperature program) may be performed in succession; a first run may be used to set, temper and/or otherwise prepare the sample for one or more subsequent runs. During at least part of a first run a gas flush control may be performed to remove any gases and/or volatile substances from the sample and/or sample chamber (which could also be done with the reference and/or reference chamber but if sufficiently inert this may not be needed). During and/or after subsequent runs the chamber may be evacuated and/or pressure controlled. The temperature programs of multiple runs on the sample may differ or be the same. Differences could be in the temperature ranges spanned and/or a different rate of temperature change in one or more parts of the temperature range, any of which may be used for detailed study of particular effects; a slower heating rate (slower raising of the sample temperature may translate in increased sensitivity for (effects of) changes in heat capacity $c_p$ and/or phase changes f(T, t) of the sample.

The computer and/or microcontroller may be configured to

- heat up the sample from a first predetermined temperature to a second predetermined higher temperature, e.g. a maximum temperature, at a predetermined heating rate,
- keep the sample at this second predetermined temperature for a first predetermined time, e.g. a predetermined number of minutes in order to have a homogeneous temperature for at least some and/or part of the whole sample, sample chamber, heater and sensors.
- cool the sample back down to a third predetermined temperature which may be equal to or different from the first predetermined temperature, at a predetermined cooling rate,
- keep the sample at this third predetermined temperature for a second predetermined time, e.g. a predetermined number of minutes.

Such cycle can be repeated many times, but a minimum of two cycles is recommended.

Any analog measurement signal may be converted to a digital signal and subsequently to temperature values. Then various calculations and analyses can be done. For example, a change in temperature difference between sample chamber and reference chamber per unit time can be constructed to find characteristic phase transitions.

The disclosure is not restricted to the above described embodiments which can be varied in a number of ways within the scope of the claims. For instance, plural samples may be studied relative to a single reference, either in parallel or sequentially. Determination may be on the basis of simultaneous or non-simultaneous measurements. Also or alternatively, a sample may be studied relative to several references, e.g. in case different references are preferred for different (possibly partly overlapping) temperature ranges. Control of gas composition may include changing from an inert gas to a reactive gas, e.g. an oxygen-containing gas, mixture to study effects of one or more chemical reactions such as oxidation.

Various embodiments may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

In particular, an apparatus may be provided having a sample container for holding a sample;

- a reference and/or a reference container for holding a reference;
- a sample heater and a reference heater;
- a sample temperature detector for determining a temperature and/or a temperature change of the sample;
- a reference temperature detector for determining a temperature and/or a temperature change of the reference;
- and means adapted to execute the steps of heating and/or cooling the sample and the reference; and
- during the heating and/or cooling
- determining at least one of a temperature and a temperature change of the sample and of the reference;
- controlling a heating power and/or cooling power to the sample and controlling a heating power and/or cooling power to the reference on the basis of a difference in the temperature and/or the temperature change relative to a predetermined temperature and/or temperature change;
- and the step of determining at least one thermodynamic property of the sample and/or a composition of the sample on the basis of at least one of temperature of the sample, temperature change of the sample and heating and/or cooling power to the sample relative to at least one of temperature of the reference, temperature change of the reference and heating and/or cooling power to the reference of any method provided herein.

Further, a computer program is provided comprising instructions to cause the aforementioned apparatus to execute the steps of any method provided herein.

Also a computer-readable medium is provided having stored thereon the aforementioned computer program.

Elements and aspects discussed for or in relation with a particular embodiment may be suitably combined with elements and aspects of other embodiments, unless explicitly stated otherwise.

The invention claimed is:

1. A method of differential scanning calorimetry comprising:

heating and/or cooling a sample and a reference; and during the heating and/or cooling determining at least one of a temperature and a temperature change of the sample and of the reference;

controlling a heating power and/or cooling power to the sample and controlling a heating power and/or cooling power to the reference on a basis of a difference in the temperature and/or the temperature change relative to a predetermined temperature and/or temperature change;

determining at least one thermodynamic property of the sample and/or a composition of the sample on a basis of at least one of temperature of the sample, temperature change of the sample and heating and/or cooling power to the sample relative to at least one of temperature of the reference, temperature change of the reference and heating and/or cooling power to the reference; and wherein the sample is heated and/or cooled on a first sample side and the temperature and/or the temperature change of the sample is (are) determined on a second sample side opposite the first sample side, and the reference is heated and/or cooled on a first reference side and the temperature and/or the temperature change the reference is (are) determined on a second reference side opposite the first reference side.

2. The method according to claim 1, further comprising determining at least one of a temperature and a temperature change of the sample on the first sample side; and/or determining at least one of a temperature and a temperature change of the reference on the first reference side.

3. The method of differential scanning calorimetry according to claim 1, wherein determining at least one of the temperature and the temperature change of the sample and of the reference comprises determining at least one of the temperature and the temperature change of the sample in plural positions on the first sample side and/or second sample side and/or determining at least one of the temperature and the temperature change of the reference in plural positions on the first reference side and/or second reference side.

4. The method according to claim 1, wherein the sample has a size in a first dimension being at least one order of magnitude less than in a second dimension.

5. The method according to claim 4, wherein the sample has a size in the first dimension being a plural orders of magnitude less than in a second dimension.

6. The method according to claim 4, wherein the sample has a size in the first dimension being is also at least one order of magnitude less than in a third dimension.

7. The method according to claim 4, wherein the sample has a size in the first dimension being also a plural orders of magnitude less than in a third dimension.

8. The method according to claim 1, wherein at least part of the sample is placed in an upright sample container, and wherein the first and second sample sides are defined by horizontally opposite sides of the sample container; and/or at least part of the reference is placed in an upright reference container, and wherein the first and second reference sides are defined by horizontally opposite sides of the reference container.

9. The method according to claim 8, wherein the upright sample container is liquid tight for holding a liquid sample portion, and/or the upright reference container is liquid tight for holding a liquid reference portion.

10. The method according to claim 1, wherein determining the at least one thermodynamic property of the sample comprises determining the at least one thermodynamic property of the sample on a basis of the equation:

$$\partial_T H = C_P + \frac{c_P \rho L^2}{k\Delta T} f(T, t). \quad (7)$$

11. A non-transitory computer-readable medium having stored thereon instructions, which when executed by a processor perform a method comprising:

heating and/or cooling a sample and a reference; and during the heating and/or cooling determining at least one of a temperature and a temperature change of the sample and of the reference;

controlling a heating power and/or cooling power to the sample and controlling a heating power and/or cooling power to the reference on a basis of a difference in the temperature and/or the temperature change relative to a predetermined temperature and/or temperature change;

determining at least one thermodynamic property of the sample and/or a composition of the sample on a basis of at least one of temperature of the sample, temperature change of the sample and heating and/or cooling power to the sample relative to at least one of temperature of the reference, temperature change of the reference and heating and/or cooling power to the reference; and wherein the sample is heated and/or cooled on a first sample side and the temperature and/or the temperature change of the sample is (are) determined on a second sample side opposite the first sample side, and the reference is heated and/or cooled on a first reference side and the temperature and/or the temperature change the reference is (are) determined c a second reference side opposite the first reference side.

12. An apparatus for power compensation differential scanning calorimetry, comprising:

a sample container for holding a sample;

a reference and/or the reference container for holding a reference;

a sample heater and a reference heater;

a sample temperature detector for determining a temperature and/or a temperature change of the sample;

a reference temperature detector for determining a temperature and/or a temperature change of the reference;

a controller operably coupled to the sample heater and reference heater and configured for controlling a heating power and/or cooling power to the sample and controlling a heating power and/or cooling power to the reference on a basis of a difference in the temperature and/or the temperature change relative to a predetermined temperature and/or temperature change, wherein the sample heater is arranged for heating and/or cooling the sample on a first sample side and the sample temperature detector is arranged for determining the temperature and/or a temperature change of the sample on a second sample side opposite the first sample side, and the reference heater is arranged for heating and/or cooling the reference on a first reference side and the reference temperature detector is arranged for determining the temperature and/or a temperature change of the reference on a second reference side opposite the first reference side.

13. The apparatus according to claim 12, comprising a further sample temperature detector configured to determine a temperature and/or a temperature change of the sample arranged on the first sample side; and/or a further reference temperature detector configured to determine a temperature and/or a temperature change of the reference arranged on the first reference side.

14. The apparatus according to claim 12, wherein the first and second sides of the sample container are opposite each other in a first dimension and the sample container has a size in a first dimension being at least one order of magnitude less than in a second dimension.

15. The apparatus according to claim 14, wherein the sample has a size in a first dimension being a plural orders of magnitude less than in a second dimension.

16. The apparatus according to claim 14, wherein the sample has a size in the first dimension being is also at least one order of magnitude less than in a third dimension.

17. The apparatus according to claim 12, wherein the sample container and/or the reference container comprise an upright sample container defining the first and second sides as upright sides on generally horizontally opposite sides of the sample container, and/or wherein the sample container is liquid tight for holding a liquid sample portion.

18. The apparatus according to claim 12, comprising a sample chamber accommodating the sample container and a gas system and/or a vacuum system connected to the chamber for controlling at least one of a gas composition and/or gas humidity, a gas temperature, a gas flow around and/or through at least part of the sample container.

19. The apparatus according to claim 12, wherein at least one of the sample temperature detector and reference temperature detector is arranged for determining a temperature and/or a temperature difference as a function of position, and/or comprises a plurality of temperature sensors in plural positions on the respective one(s) of the second sample side and second reference side.

20. The apparatus according to claim 13, wherein at least one of the further sample temperature detector and further reference temperature detector is arranged for determining a temperature and/or a temperature difference as a function of position, and/or comprises a plurality of temperature sensors in plural positions on the respective one(s) of the first sample side and first reference side.

* * * * *